(12) United States Patent
Seo

(10) Patent No.: US 6,834,962 B2
(45) Date of Patent: Dec. 28, 2004

(54) PROJECTION SYSTEM

(75) Inventor: Eun Seong Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/650,228

(22) Filed: Aug. 28, 2003

(65) Prior Publication Data

US 2004/0075816 A1 Apr. 22, 2004

(30) Foreign Application Priority Data

Aug. 30, 2002 (KR) ................................ 10-2002-0051927

(51) Int. Cl.[7] .................. G03B 21/14; G03B 21/20; G02B 5/30; G02B 27/00; G02B 7/00
(52) U.S. Cl. .................. 353/20; 353/38; 353/84; 353/102; 359/483; 359/577; 359/892
(58) Field of Search .................. 353/20, 31, 33, 353/34, 37, 38, 84, 102; 349/9; 348/744; 359/892, 483, 577

(56) References Cited

U.S. PATENT DOCUMENTS 5,868,480 A * 2/1999 Zeinali ........................ 353/31
6,739,723 B1 * 5/2004 Haven et al. .................. 353/20

FOREIGN PATENT DOCUMENTS

JP     07-072450    * 3/1995      ............. G02F/1/13
JP     2000-347292    * 12/2000      ........... G03B/21/14

* cited by examiner

Primary Examiner—Judy Nguyen
Assistant Examiner—Melissa J Koval
(74) Attorney, Agent, or Firm—Lee, Hong, Degerman, Kang & Schmadeka (57) ABSTRACT

The present invention relates to a projection system that can be applied to a projection TV or a projection monitor, and more particularly, to a projection system that can improve a contrast while maintaining a proper brightness of a set where the projection system is applied.

20 Claims, 9 Drawing Sheets

PROJECTION SYSTEM

BACKGROUND OF THE INVENTION

1. Field of the Invention

The present invention relates to a projection system that can be applied to a projection TV or a projection monitor, and more particularly, to a projection system that can improve a contrast while maintaining a proper brightness of a set to which the projection system is applied.

2. Description of the Related Art

An optical system that is employed to a projection TV or a projection monitor is generally comprised of a polarization converting part for converting light that is irradiated from a light source lamp and has an irregular polarization direction (the light source will be referred as "irregular polarization light flux" hereinafter) into a plurality of polarization light fluxes having an identical single polarization direction, and a color separating part for separating the polarization light fluxes, which are irradiated from the polarization converting part with the single polarization direction, by colors.

Figure 1:
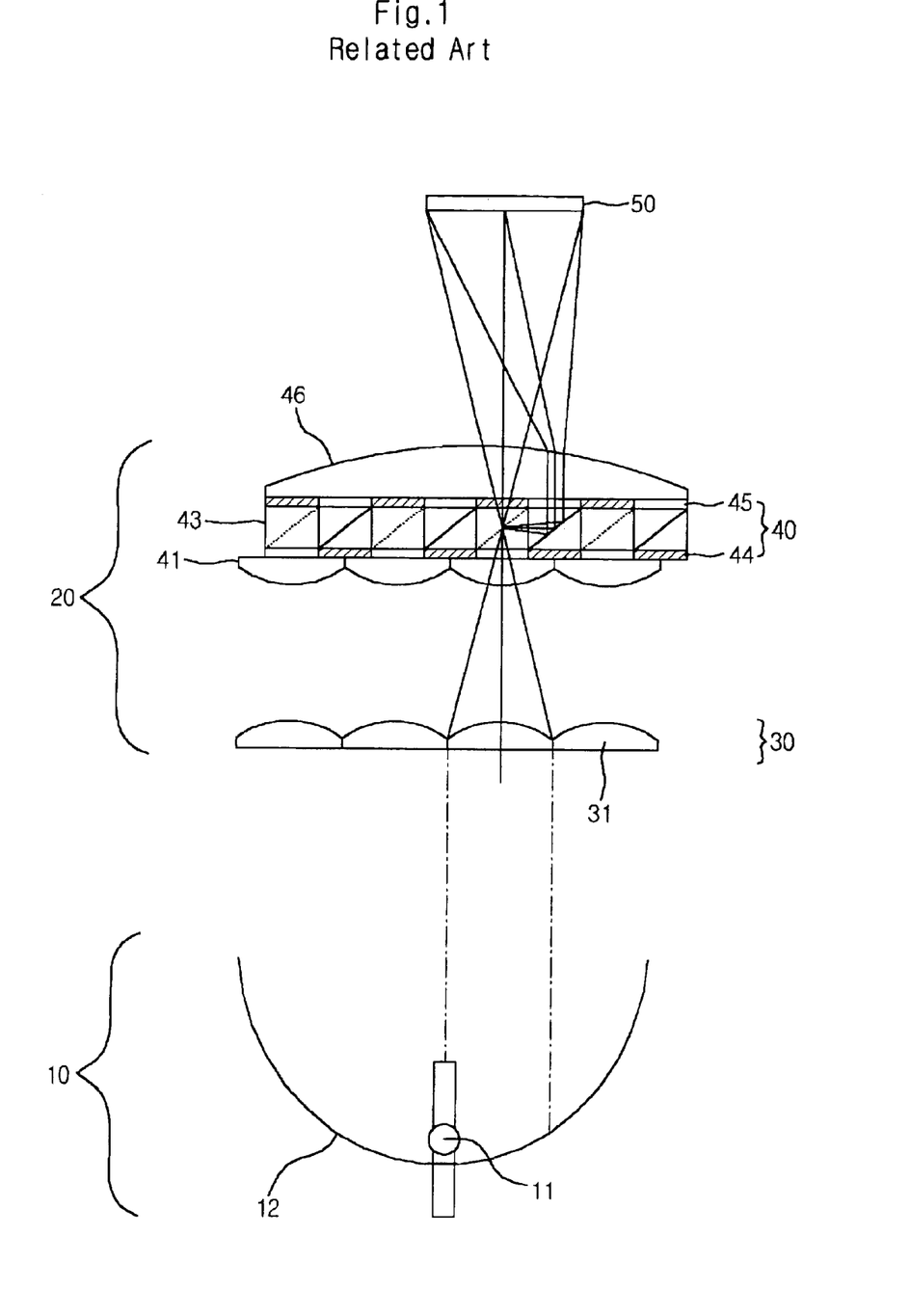
FIG. 1 shows a detailed view of a polarization converting part of a conventional optical system.

FIG. 1 shows a detailed view of a polarization converting part of a conventional optical system.

As shown in FIG. 1, a polarization converting part includes a light source part 10 comprised of a light source lamp 11 and a parabolic reflector 12 and a polarization generating part 20 comprised of a first optical element 30 and a second optical element 40.

In addition, the first optical element 30 includes a plurality of light flux dividing lenses 31 shaped in a rectangular are arranged in a matrix configuration, and the second optical element 40 is formed in a complex member comprised of a condenser lens array 41, a light shielding plate 44, a polarization separating unit array 43, a selective phase difference plate 45, and a coupling lens 46.

The coupling lens 46 can be separated for convenience.

In the polarization converting part constructed as above, the irregular polarization light flux that is incident from the light source part 10 to the first optical element 30 is divided into a plurality of intermediate light fluxes by the light flux dividing lenses 31.

The divided intermediate light fluxes are spatially separated in a P-polarization light flux space and an S-polarization space by the polarization separating unit array 43. And then, the spatially separated polarization directions are coincided in an identical single polarization direction by the selective phase difference plate 45. The coincided polarization light fluxes are induced toward a panel 50 through the coupling lens 46.

The coincided polarization light fluxes generated from the polarization converting part is separated by colors while passing through a reflection or transmission filter of the color separation part.

Figure 2:
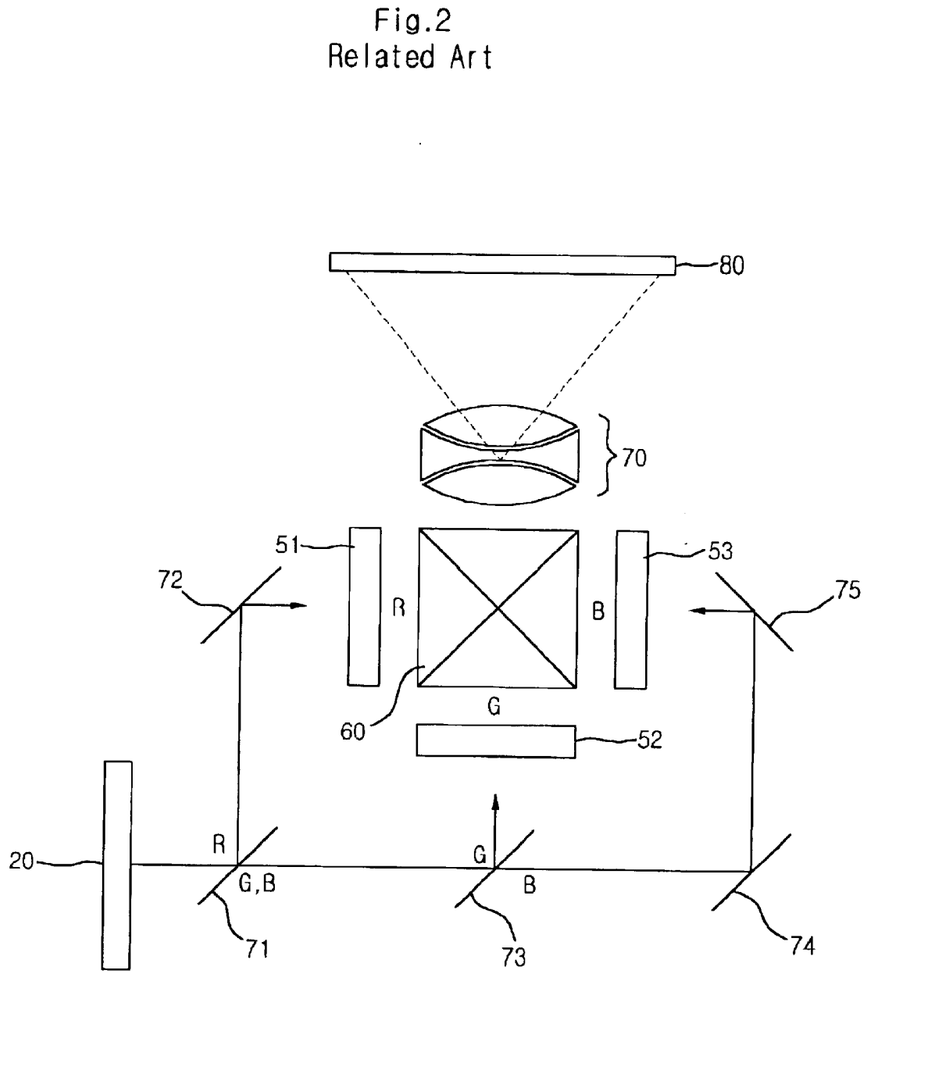
FIGS. 2 and 3 show a detailed view of a conventional color separation part.
Figure 3:
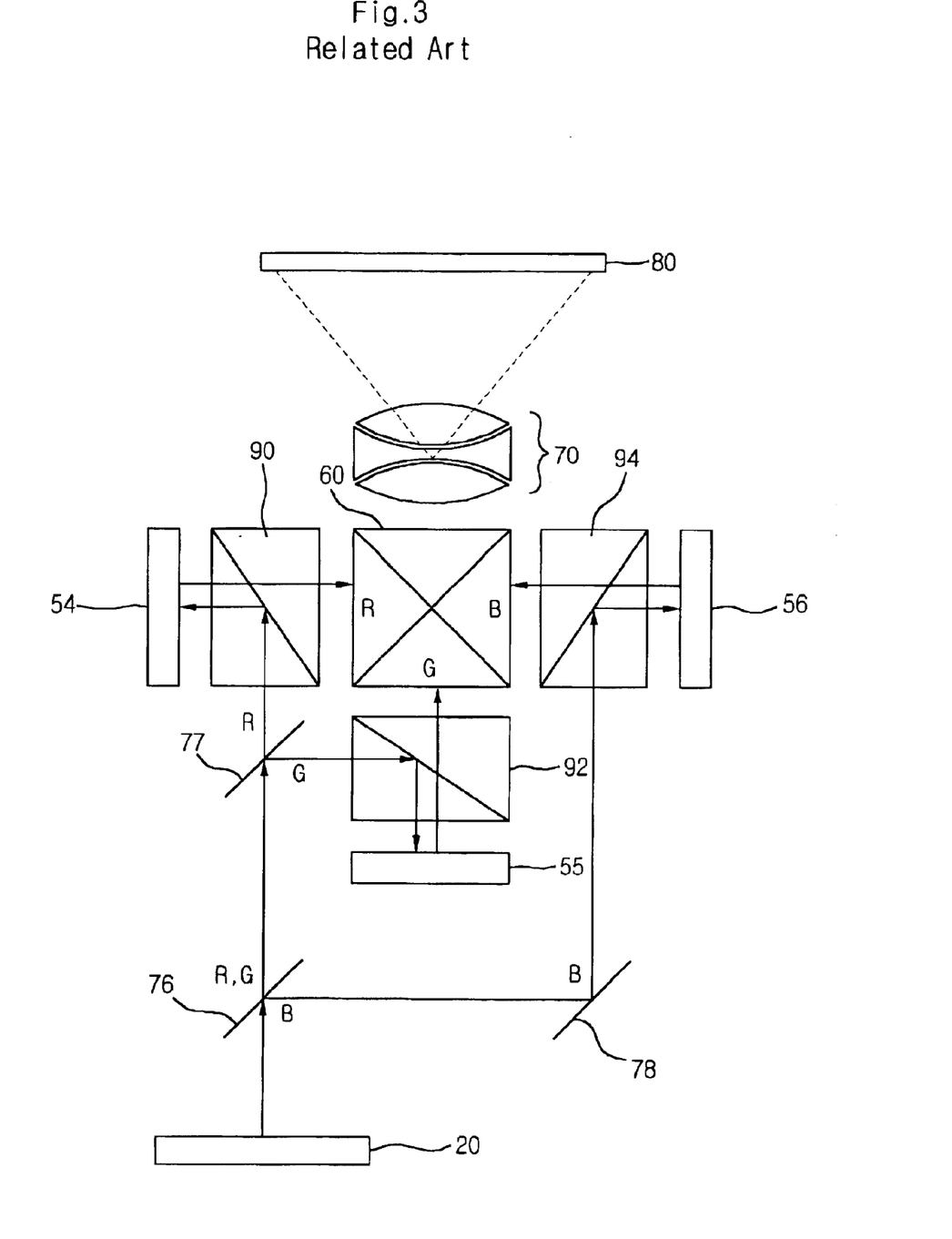

FIGS. 2 and 3 show a detailed view of a conventional color separation part.

FIG. 2 illustrates a transmissive LCD. As light flux emitted from the polarization generating part 20 is incident into a red light reflection mirror 71 of the color and light separation means, blue and green lights are transmitted but red light is reflected on the red light reflection mirror 71. The reflected red light is reflected by a downstream reflection mirror 72 to reach a red light liquid crystal part 51.

Meanwhile, as the blue and green lights transmitted through the red light reflection mirror 71 are again incident into a green light reflection mirror 73, the green light is reflected and the blue light is transmitted.

The reflected green light reaches the green light liquid crystal part 52, and the blue light transmitted through the green light reflection mirror 73 is reflected by a downstream blue light reflection mirror 74.

The reflected blue light is reflected by the downstream reflection mirror 75 to reach the blue light liquid crystal part 53.

The three liquid crystal parts 51, 52 and 53 modulate each of the color lights. The modulated color lights containing image information corresponding to the color lights is incident to color lights synthesizing means such as a cross dichroic prism 60. The cross-dichroic prism 60 forms a color image by synthesizing the modulated fluxes to form a color image. The color image is projected to a screen 80 by a projection lens 70 defining a projection optical system, thereby forming a projected color image.

FIG. 3 illustrates a reflective LCD. As light flux emitted from the polarization generating part 20 is incident into a blue light reflection mirror 76 of the color and light separation means, red and green lights are transmitted but blue light is reflected by the blue light reflection mirror 76.

The reflected blue light is reflected by a downstream reflection mirror 78 and then reflected by a downstream blue light filter 94 to reach a blue light liquid crystal part 56, and is then shifted in its phase by 90°. After that, the phase-shifted light is incident into a cross dichroic prism 60 through the blue light filter 94.

Meanwhile, as the red and green lights transmitted through the green light reflection mirror 77 are incident into the green light reflection mirror 77 of the color and light separating means, the green light is reflected by the green light reflection mirror 77 and the red light is transmitted.

The reflected green light is reflected by the green light filter 92 to reach a green light liquid crystal part 55, and is then phase-shifted by 90°. After that, the phase-shifted light is incident to the cross dichroic prism 60 through the green light filter 92.

The red light transmitted through the green light reflection mirror 77 is reflected by a red light filter 90 to reach a red light liquid crystal part 54, and is then phase-shifted by 90° through the red light liquid crystal part. After that, the phase-shifted light is incident to the diachronic prism 60 via the red light filter 90.

The cross-dichroic prism 60 synthesizes the modulated light fluxes to form a color image. The color image formed by the cross-dichroic prism 60 is projected onto a screen 80 by a projection lens 70, which is a kind of a projection optical system, thereby forming a projected color image.

The above-described optical system can be classified into a single plate type, a dual plate type, and a triple plate type depending on the number of the liquid crystal parts that are a display device. The optical systems depicted in FIGS. 2 and 3 are exampled as the triple optical system.

However, the above-described optical system has a problem in that the brightness and the contrast are oppositely related with each other. That is, when the contrast is increased, the brightness is reduced, whereas when the brightness is increased, the contrast is reduced.

SUMMARY OF THE INVENTION

Accordingly, the present invention is directed to a projection system that substantially obviates one or more problems due to limitations and disadvantages of the related art.

An object of the present invention is to provide a projection system that can improve a contrast while maintaining a proper brightness of a set to which the projection system is applied.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a projection system comprising a polarization converting part for converting an incident polarization light flux into a polarization light flux having one direction, and a color separating part for color-separating the polarization light flux irradiated from the polarization converting part, the polarization converting part comprising: an FEL having a plurality of light flux dividing lenses shaped in a square and arranged in a matrix configuration, for dividing an incident light in a unit of cell; a condenser lens array for converting an incident light that is incident from the FEL, into a parallel light with respect to a specific portion; a green light filter for reflecting a part of green light of a plurality of intermediate light fluxes dividedly outputted from the FEL and passing remaining light; a polarization separating unit array for converting an incident light outputted from the condenser lens array into a linearly polarized light having a single optic axis; and a coupling lens for condensing an output light from the polarization separating unit array.

Also, the green light filter is formed up and down so that a part of an upper portion and a lower portion of an incident green light among the plurality of intermediate light fluxes can be shielded.

Further, the green light filter is formed left and right so that a part of a left portion and a right portion of an incident green light among the plurality of intermediate light fluxes can be shielded.

Furthermore, the green light filter is formed up, down, left and right so that a part of an upper portion, a lower portion, a left portion and a right portion of an incident green light among the plurality of intermediate light fluxes can be shielded.

Moreover, the green light filter is formed at a portion except for a circular central portion so that the portion except for the circular central portion of an incident green light among the plurality of intermediate light fluxes can be shielded.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 4:
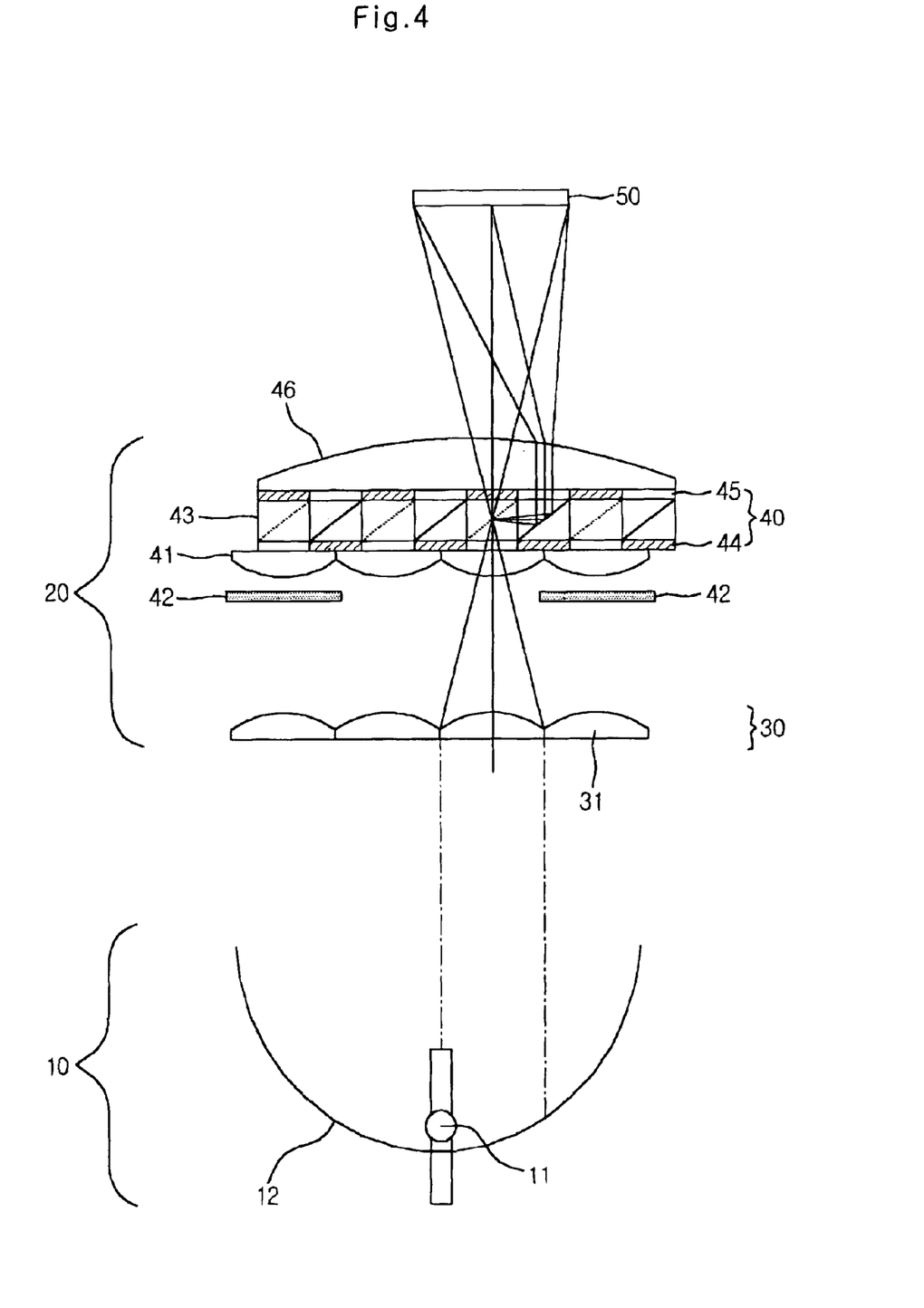
FIG. 4 is a detailed view of a projection system according to the present invention.

FIG. 4 is a detailed view of a projection system according to the present invention.

As shown in FIG. 4, a polarization converting part includes a light source part 10 comprised of a light source lamp 11 and a parabolic reflector 12, and a polarization generating part 20 comprised of a first optical element 30 and a second optical element 40.

The first optical element 30 includes a plurality of light flux dividing lenses 31 arranged in a matrix configuration and called "FEL (Fly-Eye Lens).

The second optical element 40 is made in a complex member, which includes a condenser lens array 41 for converting an incident light that is incident from the FEL 31, into a parallel light with respect to a specific portion, a green light filter 42 formed at edges between the FEL 31 and the condenser lens array 41, for reflecting only the green light of a plurality of intermediate light fluxes dividedly outputted from the FEL 31 and passing remaining light, a light shielding plate 44 for converting an incident light outputted from the condenser lens array 41 into a linearly polarized light, a polarization separating unit array 43, a selective phase difference plate 45, and a coupling lens 46 for condensing an output light from the polarization separating unit array 43.

The coupling lens 46 can be separated for convenience.

The polarization converting part constructed as above divides an irregular polarization light flux that is incident from the light source part 10 to the first optical element 30, into a plurality of intermediate light fluxes by the light flux dividing lenses 31.

After that, the divided intermediate light fluxes are incident into the polarization separating unit array 43 via the green light filter 42.

The green light filter 42 reflects the green light of the incident light fluxes and pass the red light and the blue light.

Thus, the green light filter 42 is used to adjust the angle of the light that is incident into a panel through the coupling lens 46.

In other words, since the arc of a used lamp that is an optic system source is not a point source but a face source and thus light is irradiated dispersed with a predetermined angle, the angle of the light that is incident into the panel 50 through the coupling lens 46 has a close relationship with amount and contrast of the light.

Accordingly, by making the angle of the output light from the light source part 10 large, the brightness of a set is increased and the contrast of the set is deteriorated. On the other hand, by making the angle of the output light small, the contrast of the light is enhanced and the brightness of the set is decreased.

In the above, the green light influences the contrast and the red and blue lights influence the brightness.

The contrast and the brightness of the set are pitted against each other. Reviewing the lamp of the present projection TV, since the green light is considerably larger than the blue light, the green light is cut away circuit-optically.

However, if the green light is cut away circuit-optically, the contrast of the set is enhanced but the brightness of the set is decreased.

Accordingly, the projection system of the present invention does not cut away the green light but makes the angle of the transmitted green light small to enhance the contrast with maintaining the brightness of the set.

In other words, the angle of the incident green light is made small to enhance the contrast while the angles of the blue light and the red light are maintained so as not to influence the brightness of the set.

For this purpose, the green light filter 42 is formed at a predetermined region on a path of the light that is incident into the second optical element 40. Accordingly, the red light and the blue light maintain their brightness since a change in the angle is not given, while the contrast of the green light is changed by changing the angle of the green light.

Figure 5:
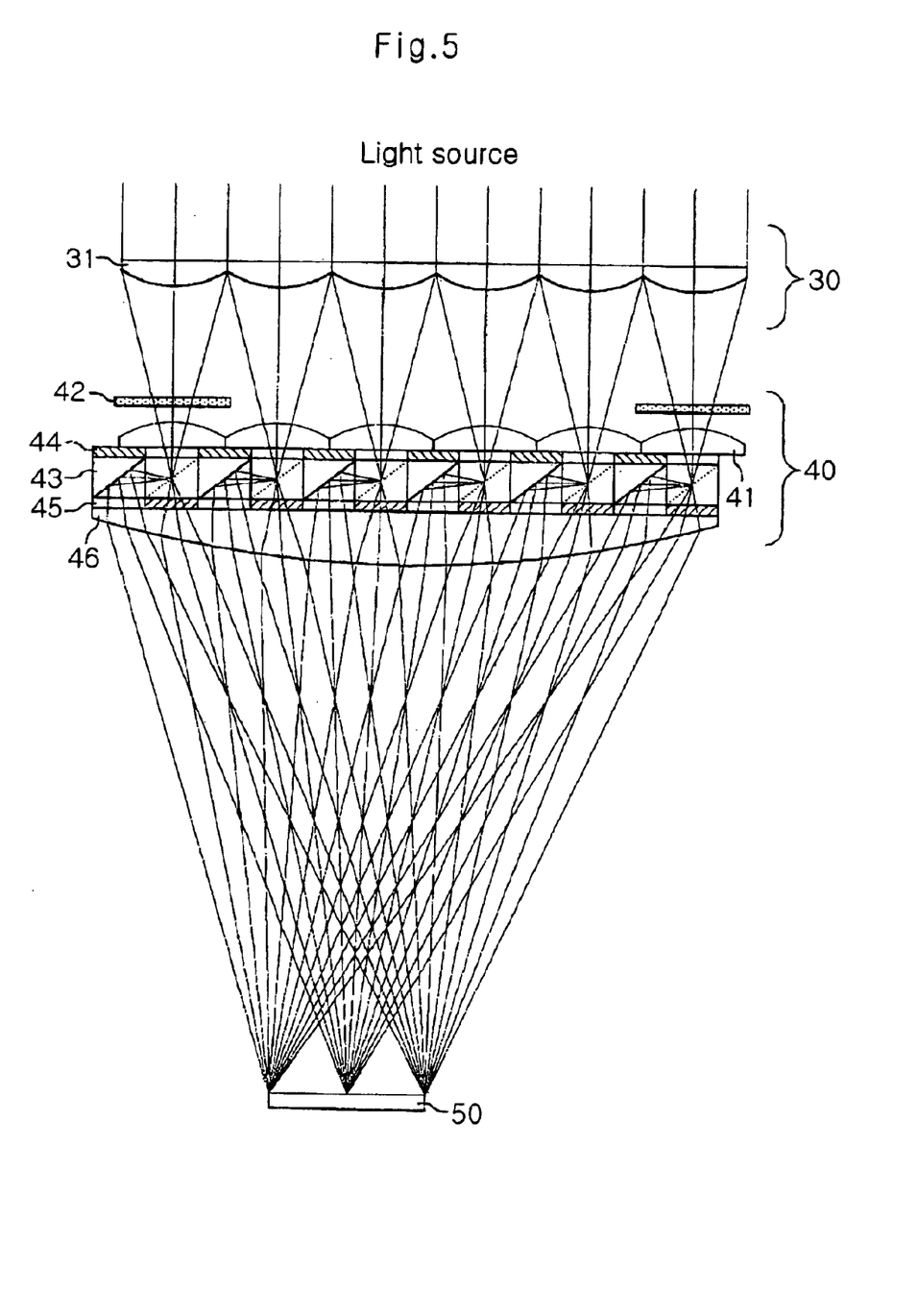
FIG. 5 is a view illustrating paths of the red light and the blue light in the polarization converting part of a projection system according to a preferred embodiment of the present invention.
Figure 6:
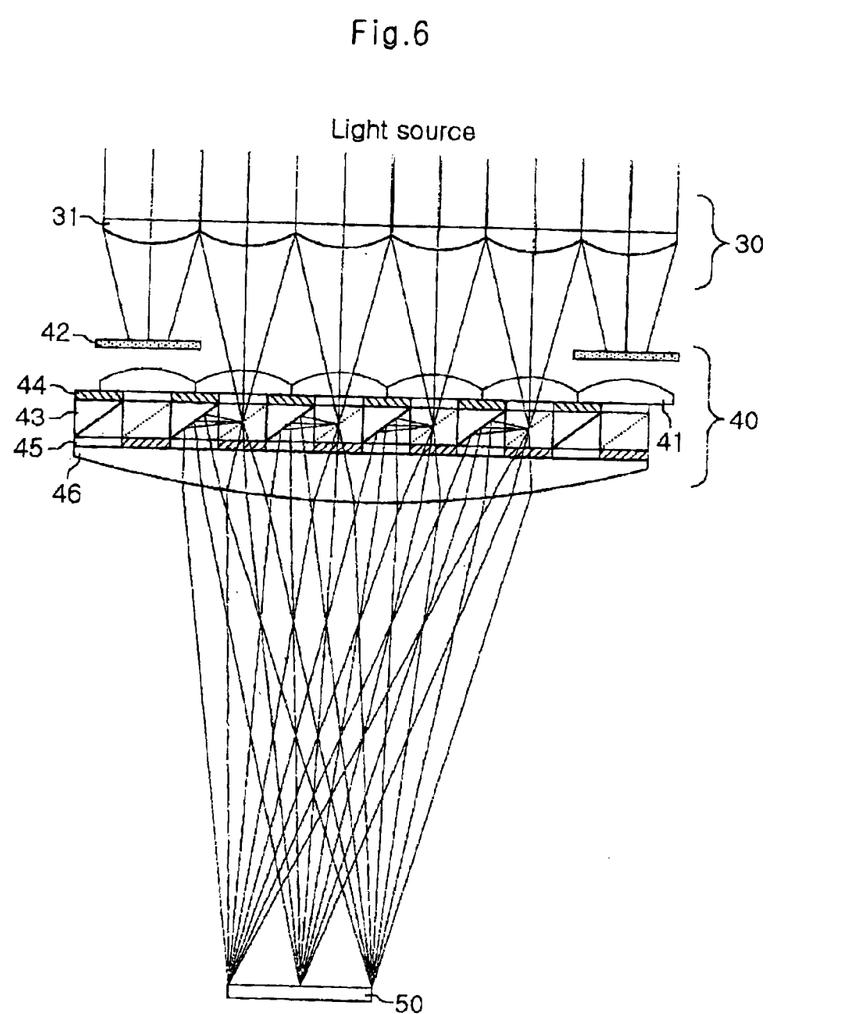
FIG. 6 is a view illustrating a path of the green light in the polarization converting part of a projection system according to a preferred embodiment of the present invention.

FIG. 5 is a view illustrating paths of the red light and the blue light in the polarization converting part of a projection system according to a preferred embodiment of the present invention, and FIG. 6 is a view illustrating a path of the green light in the polarization converting part of a projection system according to a preferred embodiment of the present invention.

As shown in FIG. 5, since the red light and the blue light have the same light amount, the brightness of the set is maintained as it is.

Further, as shown in FIG. 5, since the green light is reflected from the green light filters 42 positioned at both sides of the polarization converting part and condenser lens arrays 41 positioned at both sides of the polarization converting part is not used, the green light is incident into only a central condenser lens array part not having the green light filter 42 so that an incident angle of the light into a panel can be reduced and accordingly a contrast of the set can be improved.

As described above, the contrast control using the green light is because the green light is relatively abundant than other colors of light and the contrast is greatly dependent on the green light, and the red light and the blue light are used as they are so as not to affect the brightness of the set.

This is because the brightness of the set is dependent on the red light and the blue light and accordingly, even though the green light is controlled, a whole brightness of the set is not varied.

Figure 7:
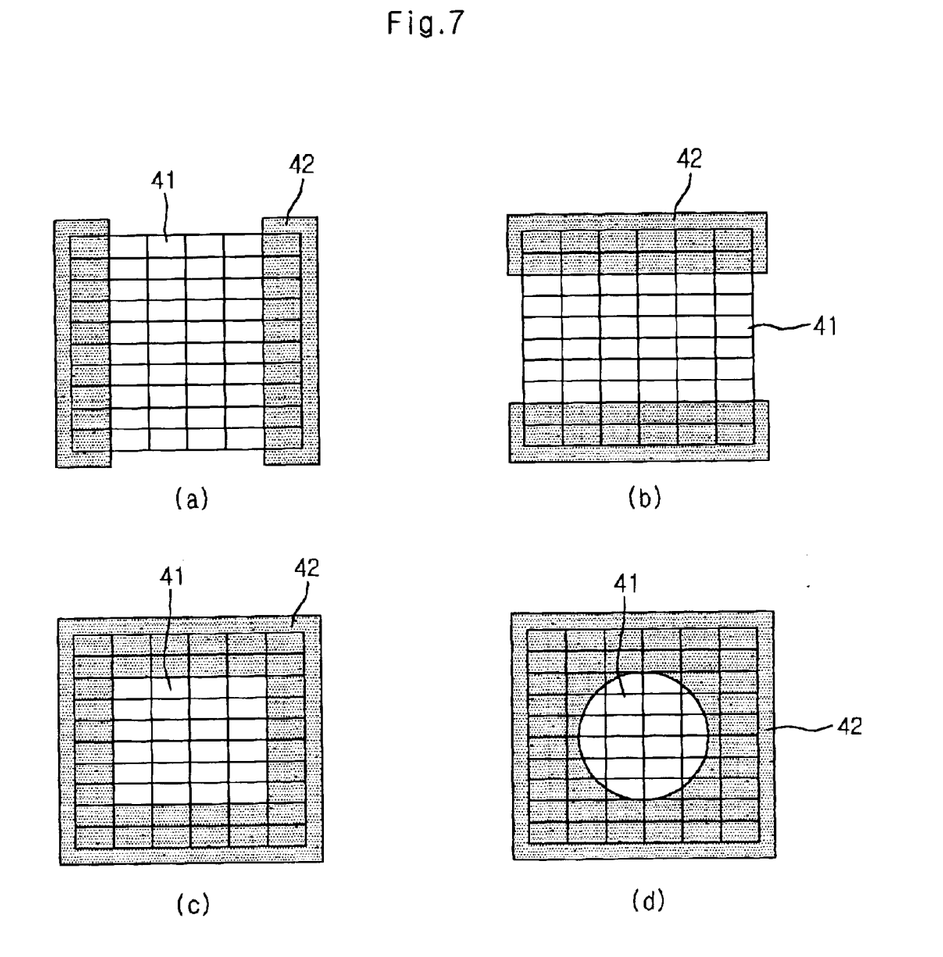
FIGS. 7A, 7B, 7C and 7D are views illustrating structures of a green light filter according to the present invention.

FIGS. 7A, 7B and 7C are views illustrating a structure of the green light filter 42 according to various embodiments of the present invention.

FIG. 7A is a view illustrating an embodiment of a structure of the green light filter 42 for reducing, at both horizontal sides, the incident angle of the green light incident into a second optical element 40.

Further, FIG. 7B is a view illustrating another embodiment of a structure of the green light filter 42 for reducing, at both vertical sides, the incident angle of the green light incident into the second optical element 40.

Furthermore, FIG. 7C is a view illustrating yet another embodiment of a structure of the green light filter 42 for reducing, at an upper and lower side and at a left and right side, the incident angle of the green light incident into the second optical element 40.

Additionally, FIG. 7D is a still another embodiment of a structure of the green light filter 42 for circularly reducing the incident angle of the green light incident into the second optical element 40.

Through ways shown in FIGS. 7A, 7B, 7C and 7D, the incident angle of the green light can be optionally controlled vertically, horizontally or bi-directionally, etc. depending on a characteristic of the projection system.

As mentioned above, the light incident into the second optical element 40 via the green light filter 42 is respectively spatially separated in a P-polarized light flux and an S-polarized light flux through a polarization separate unit array 43.

Additionally, a selective phase difference plate 45 unites spatially separated polarization directions into one, and introduces the united polarization light flux into a panel 50 through a coupling lens 46.

Figure 8:
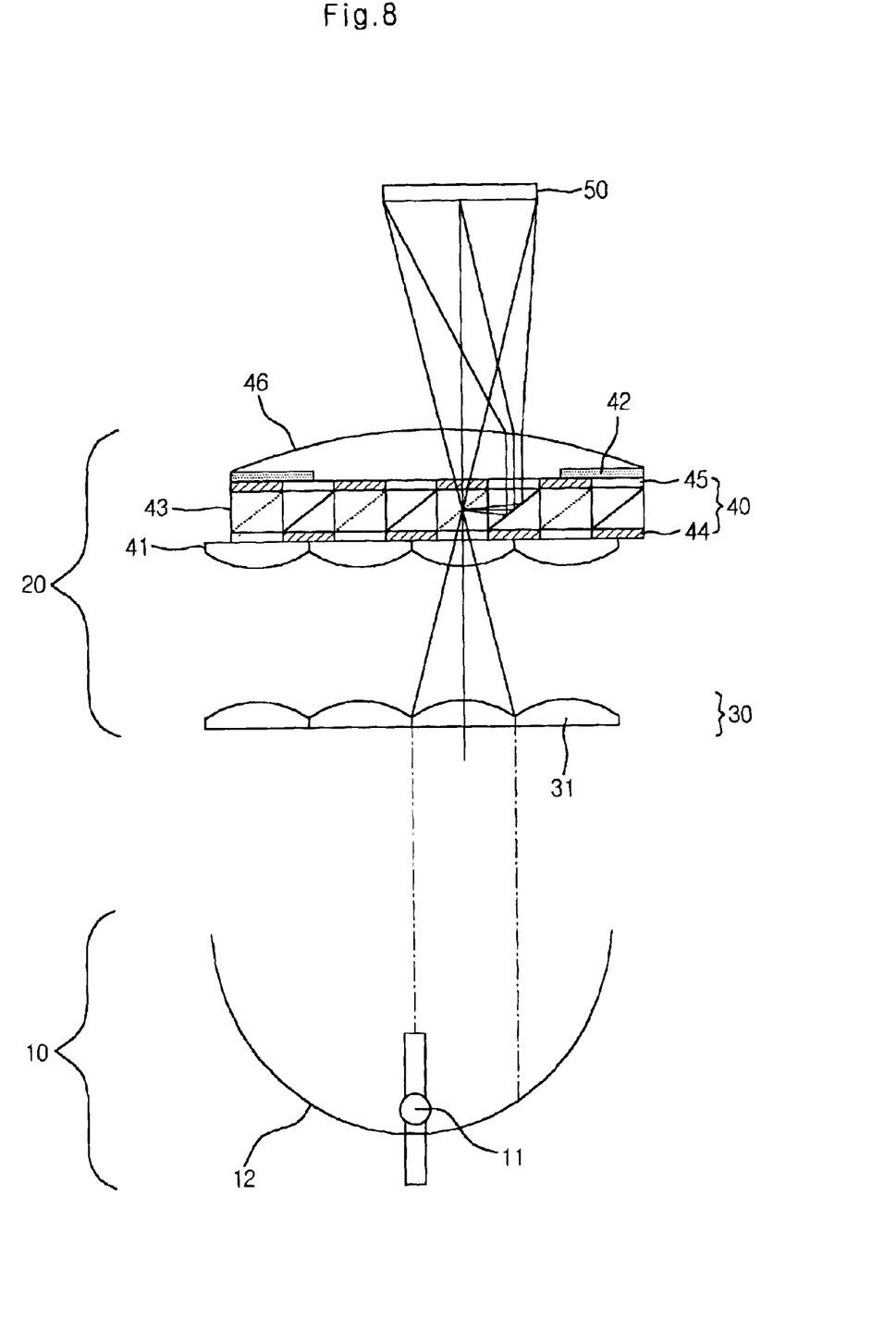
FIG. 8 is a view illustrating the position of the green light filter according to another embodiment of the present invention.
Figure 9:
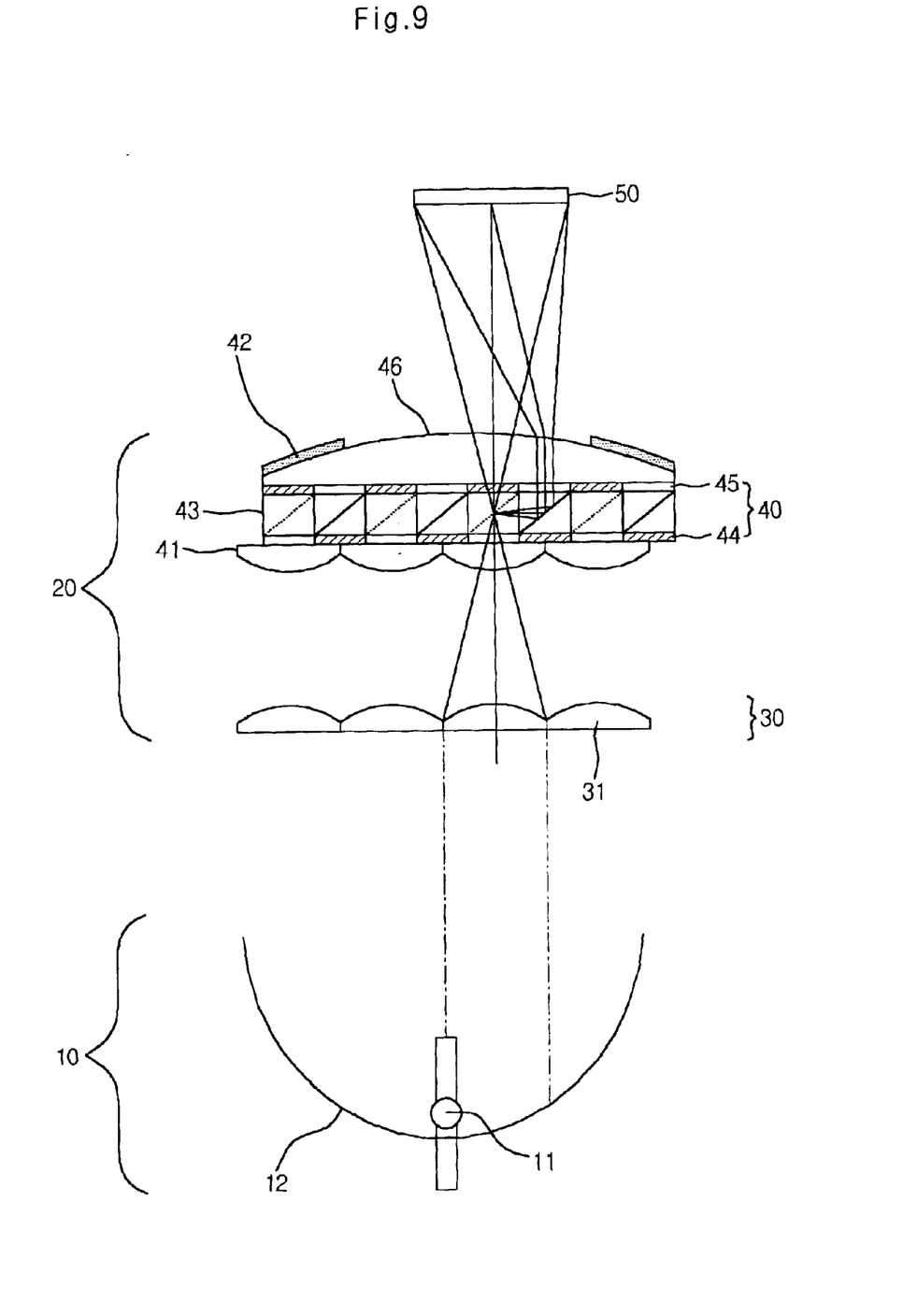
FIG. 9 is a view illustrating the position of the green light filter according to a further embodiment of the present invention.

As described above, in this embodiment, the green light filter 42 is positioned between the FEL 31 and the condenser lens array 41, but the green light filter 42 can be, as shown in FIG. 8, allowed to be positioned between the polarization separate unit array 43 and the coupling lens 46, and can be, as shown in FIG. 9, allowed to be positioned on a surface of the coupling lens 46.

As described above, the projection system according to the present invention has an advantage in that the whole brightness of the projection set is maintained as it is while the contrast can be increased.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A projection system comprising a polarization converting part for converting an incident polarization light flux into a polarization light flux having one direction, and a color separating part for color-separating the polarization light flux irradiated from the polarization converting part, the polarization converting part comprising:

an FEL having a plurality of light flux dividing lenses shaped in a square and arranged in a matrix configuration, for dividing an incident light in a unit of cell;

a condenser lens array for converting an incident light that is incident from the FEL, into a parallel light with respect to a specific portion;

a green light filter for reflecting a part of green light of a plurality of intermediate light fluxes dividedly outputted from the FEL and passing remaining light;

a polarization separating unit array for converting an incident light outputted from the condenser lens array into a linearly polarized light having a single optic axis; and a coupling lens for condensing an output light from the polarization separating unit array.

2. The projection system of claim 1, wherein the green light filter is formed up and down so that a part of an upper portion and a lower portion of an incident green light among the plurality of intermediate light fluxes can be shielded.

3. The projection system of claim 1, wherein the green light filter is formed left and right so that a part of a left portion and a right portion of an incident green light among the plurality of intermediate light fluxes can be shielded.

4. The projection system of claim 1, wherein the green light filter is formed up, down, left and right so that a part of an upper portion, a lower portion, a left portion and a right portion of an incident green light among the plurality of intermediate light fluxes can be shielded.

5. The projection system of claim 1, wherein the green light filter is formed at a portion except for a circular central portion so that the portion except for the circular central portion of an incident green light among the plurality of intermediate light fluxes can be shielded.

6. The projection system of claim 1, wherein the green light filter is located between the FEL and the condenser lens array.

7. The projection system of claim 6, wherein the green light filter is formed up and down so that a part of an upper portion and a lower portion of an incident green light among the plurality of intermediate light fluxes can be shielded.

8. The projection system of claim 6, wherein the green light filter is formed left and right so that a part of a left portion and a right portion of an incident green light among the plurality of intermediate light fluxes can be shielded.

9. The projection system of claim 6, wherein the green light filter is formed up, down, left and right so that a part of an upper portion, a lower portion, a left portion and a right portion of an incident green light among the plurality of intermediate light fluxes can be shielded.

10. The projection system of claim 6, wherein the green light filter is formed at a portion except for a circular central portion so that the portion except for the circular central portion of an incident green light among the plurality of intermediate light fluxes can be shielded.

11. The projection system of claim 1, wherein the green light filter is located between the polarization separating unit array and the coupling lens.

12. The projection system of claim 11, wherein the green light filter is formed up and down so that a part of an upper portion and a lower portion of an incident green light among the plurality of intermediate light fluxes can be shielded.

13. The projection system of claim 11, wherein the green light filter is formed left and right so that a part of a left portion and a right portion of an incident green light among the plurality of intermediate light fluxes can be shielded.

14. The projection system of claim 11, wherein the green light filter is formed up, down, left and right so that a part of an upper portion, a lower portion, a left portion and a right portion of an incident green light among the plurality of intermediate light fluxes can be shielded.

15. The projection system of claim 11, wherein the green light filter is formed at a portion except for a circular central portion so that the portion except for the circular central portion of an incident green light among the plurality of intermediate light fluxes can be shielded.

16. The projection system of claim 1, wherein the green light filter is located on a surface of the coupling lens.

17. The projection system of claim 16, wherein the green light filter is formed up and down so that a part of an upper portion and a lower portion of an incident green light among the plurality of intermediate light fluxes can be shielded.

18. The projection system of claim 16, wherein the green light filter is formed left and right so that a part of a left portion and a right portion of an incident green light among the plurality of intermediate light fluxes can be shielded.

19. The projection system of claim 16, wherein the green light filter is formed up, down, left and right so that a part of an upper portion, a lower portion, a left portion and a right portion of an incident green light among the plurality of intermediate light fluxes can be shielded.

20. The projection system of claim 16, wherein the green light filter is formed at a portion except for a circular central portion so that the portion except for the circular central portion of an incident green light among the plurality of intermediate light fluxes can be shielded.

* * * * *